United States Patent [19]
Norris

[11] Patent Number: 5,838,999
[45] Date of Patent: Nov. 17, 1998

[54] DUAL EXPOSURE PHOTOGRAPHIC APPARATUS AND METHOD

[75] Inventor: Philip R. Norris, North Reading, Mass.

[73] Assignee: Polaroid Corporation, Cambridge, Mass.

[21] Appl. No.: 738,772

[22] Filed: Oct. 29, 1996

[51] Int. Cl.$^6$ .......................... G03B 17/52; G03B 19/06
[52] U.S. Cl. .......................... 396/33; 396/446; 396/334; 430/497
[58] Field of Search .................. 396/30, 31, 32, 396/33, 34, 35, 36, 37, 38, 39, 40, 41, 446, 333, 334; 430/207, 209, 497, 500, 501

[56] References Cited

U.S. PATENT DOCUMENTS

| | | | |
|---|---|---|---|
| 661,504 | 11/1900 | Ehlman | 430/501 |
| 1,251,766 | 1/1918 | Gindele | 430/501 |
| 1,524,508 | 1/1925 | Cohen | 430/500 |
| 2,590,678 | 3/1952 | Caim | 430/501 |
| 3,047,387 | 7/1962 | Land | 96/48 |
| 3,183,809 | 5/1965 | Nerwin | 396/41 |
| 3,270,653 | 9/1966 | Bachelder | 95/89 |
| 3,283,683 | 11/1966 | Land | 95/13 |
| 3,314,792 | 4/1967 | Land | 96/76 |
| 3,455,692 | 7/1969 | Bachelder et al. | 96/78 |
| 3,631,773 | 1/1972 | Moodie | 396/317 |
| 3,636,845 | 1/1972 | Harvey | 396/32 |
| 3,643,570 | 2/1972 | Reid et al. | 95/18 |
| 3,673,939 | 7/1972 | Harvey | 95/13 |
| 3,754,917 | 8/1973 | Harvey | 96/76 |
| 4,200,383 | 4/1980 | Bendoni et al. | 354/304 |
| 4,212,528 | 7/1980 | Mason | 354/317 |
| 4,248,510 | 2/1981 | Baker et al. | 396/446 |
| 4,291,966 | 9/1981 | Bendoni et al. | 354/275 |
| 4,370,045 | 1/1983 | Holmes | 354/304 |
| 4,488,794 | 12/1984 | Dolgow et al. | 396/30 |
| 4,569,578 | 2/1986 | Stella et al. | 354/76 |
| 4,605,608 | 8/1986 | Bullitt | 430/206 |
| 4,660,951 | 4/1987 | Reed et al. | 354/187 |
| 4,693,576 | 9/1987 | Chen | 396/41 |
| 4,884,088 | 11/1989 | Mauchan | 354/86 |
| 4,951,073 | 8/1990 | Slavitter | 354/110 |
| 4,962,398 | 10/1990 | Sorg et al. | 354/86 |
| 5,001,502 | 3/1991 | Douglas | 354/86 |
| 5,023,636 | 6/1991 | Douglas | 354/86 |
| 5,040,009 | 8/1991 | Mizuno | 354/275 |
| 5,049,910 | 9/1991 | Hsiung | 396/446 |
| 5,073,464 | 12/1991 | Osawa et al. | 430/30 |
| 5,103,249 | 4/1992 | Keene | 354/85 |
| 5,285,894 | 2/1994 | Kamata et al. | 206/316.1 |
| 5,292,612 | 3/1994 | Polizzotto et al. | 430/207 |
| 5,440,366 | 8/1995 | Reiss et al. | 354/301 |
| 5,453,804 | 9/1995 | Norris et al. | 354/83 |

FOREIGN PATENT DOCUMENTS

| | | |
|---|---|---|
| 26 57 423 A1 | 12/1976 | Germany . |
| 52-44629 | 4/1977 | Japan . |
| 63-103220 | 5/1988 | Japan . |

OTHER PUBLICATIONS

PCT International Search Report, mailed Feb. 16, 1998.
PCT International Search Report, mailed Feb. 16, 1998 PCT/US97/19398.
PCT International Search Report, mailed Feb. 16, 1998 PCT/US97/19397.

*Primary Examiner*—A. A. Mathews
*Attorney, Agent, or Firm*—Leslie Payne

[57] ABSTRACT

There is disclosed an improved image recording method and camera for simultaneously obtaining dual latent images on respective 35 mm and self-developing films. The self-developing film contains a plurality of separate film units arranged on a strip which are sequentially pulled from the camera so that a leading one of exposed film units separate from the strip as the latter is being pulled and after an exposed film unit has been processed. Advancement of the film strip also effects advancement of the 35 mm film.

22 Claims, 8 Drawing Sheets

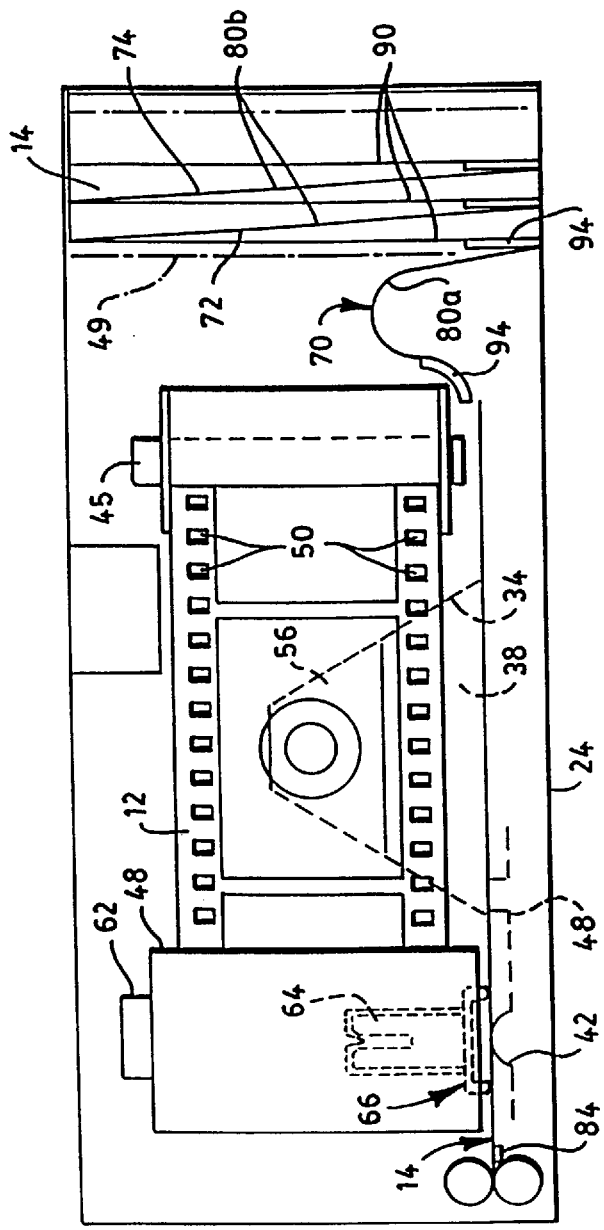

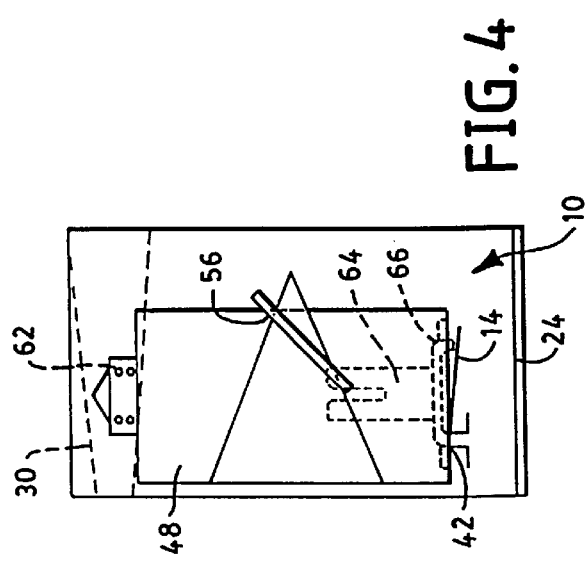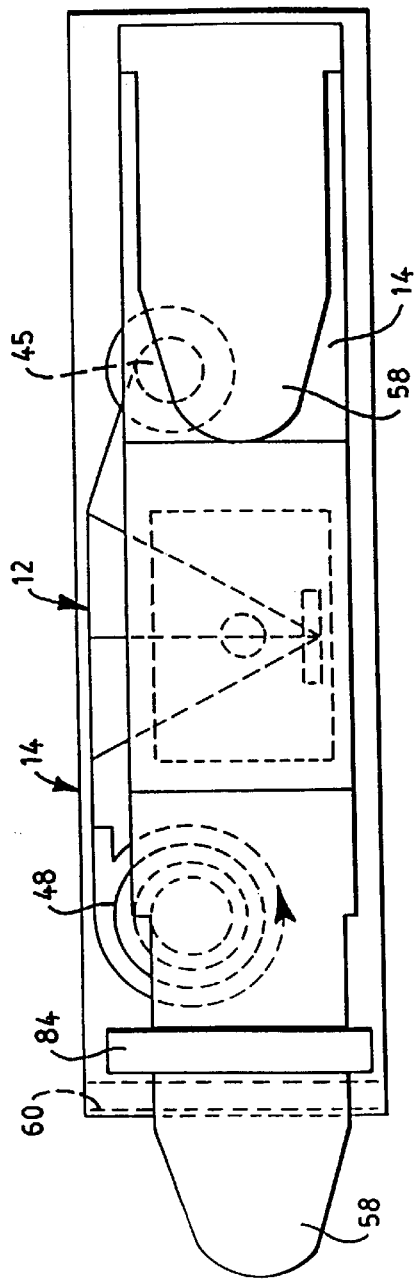

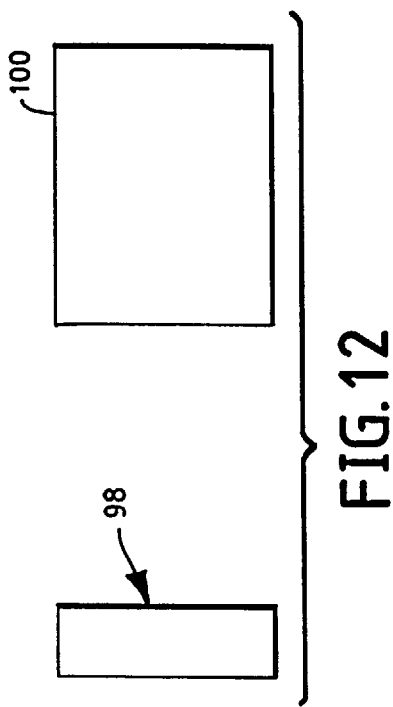
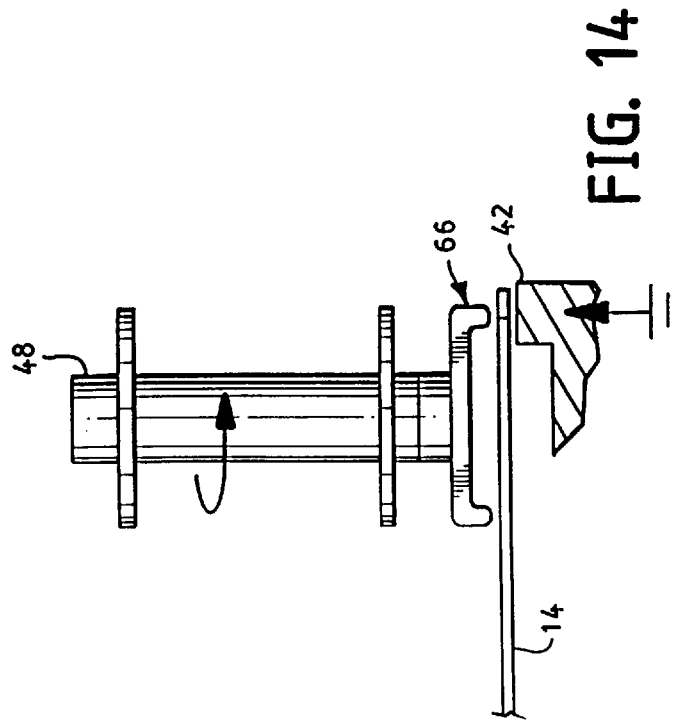

DUAL EXPOSURE PHOTOGRAPHIC APPARATUS AND METHOD

CROSS-REFERENCE TO RELATED APPLICATIONS

The present application is related to copending U.S. patent application Ser. No. 08/549,654, filed in the U.S. Patent and Trademark Office on Oct. 27, 1995, entitled "SINGLE USE CAMERA EMPLOYING SELF-DEVELOPABLE FILM AND METHOD THEREOF"; as well as copending U.S. patent application Ser. No. 08/623,018, Mar. 28, 1996 and entitled "SINGLE USE CAMERA EMPLOYING SELF-DEVELOPABLE FILM AND METHOD THEREOF" as well as continuation-in-part application Ser. No. 08/918,717 filed Aug. 22, 1997; and U.S. patent application Ser. No. 08/808,040 filed Mar. 4, 1997.

BACKGROUND OF THE INVENTION

The present invention relates to photographic apparatus and methods in general and, more particularly, to photographic apparatus and methods, whereby exposures of self-developable and photographic film are taken simultaneously; preferably within a singleuse apparatus; such that an operator is presented with a self-developed image corresponding to the image captured simultaneously by the exposed photographic film.

Users of conventional photographic cameras are able to obtain information as to the scene image captured by having it developed by a photo-finisher or photolab. Of course with the advent of instant photography, self-developable film cameras allow a user to obtain such scene information immediately. Despite the achievement of the latter development, there is nevertheless a desire to provide user of photographic cameras with a developed instant image corresponding to the scene exposed on the photographic film so as to thereby provide a positive proof of the image captured by the photographic film. Accordingly, the user can have such information and use it for a variety of purposes, such as assessing the image previously taken.

One known attempt for effecting dual exposures on instant and photographic films is described in commonly-assigned U.S. Pat. No. 4,951,073. As described in this patent, there is a relatively complicated synchronizing device employed for operating the dual cameras simultaneously so as to effect correct exposures; whereby one camera uses instant film and the other uses photographic. Such device is externally coupled to each of the two separate cameras and relies upon a relatively sophisticated control system for controlling a plurality of camera functions including shutter mechanisms and flash units to provide proper dual exposures.

Another known approach for effecting simultaneously dual exposures employs separate cameras mounted, for example, one on top of the other with a separate mechanical shutter synchronization mechanism between both cameras. Yet still another approach for effecting simultaneous exposures on both instant and photographic films includes the use of a camera, wherein both such films are exposed by light from a single exposure lens and shutter arrangement which light is split into two paths and directed to each different film.

While dual camera photography exists in which it is known to simultaneously expose both instant and photographic films either with single or dual cameras, heretofore, there does not exist a photographic apparatus and method for permitting dual exposures of both photographic and self-developable films in a compact and economical manner let alone in a singleuse camera arrangement.

SUMMARY OF THE INVENTION

In accordance with the present invention, provision is made for an improved photographic apparatus which is adapted for dual exposures of photographic and self-developable films. Such apparatus comprises housing means having self-developable film exiting means; as well as provisions for means for supplying a self-developable film within the housing means. Provision is made for camera means located within the housing means and containing photographic film therein wherein the camera includes a housing assembly defining first and second exposure openings. The photographic film is presentable at the first exposure opening, and the self-developable film is presentable at the second exposure opening. Provision is made for means for exposing at least a portion of both the photographic and self-developable films at the first and second openings; and, means for processing at least an exposed portion of the self-developable film within the housing means; and, means for allowing removal of a processed exposed portion from the exiting means.

In an illustrated embodiment, provision is made for the photographic and self-developable films each having successive exposable portions; wherein the camera includes means for advancing the successive portions of the photographic film to the first opening; and, the means for allowing removal of the self-developable film also allows successive ones of the exposable portions thereof to advance to the second opening when corresponding successive ones of processed portions are removed from the exiting means.

In an illustrated embodiment, provision is made for operating the means for advancing the photographic film and the means for advancing the self-developable film generally simultaneously.

In an illustrated embodiment, provision is made for having the camera advancing means is operated to advance successive ones of the exposable portions of the photographic film in response to removal of successive ones of the processed portions of the self-developable film.

In an illustrated embodiment, provision is made for a self-developable film assemblage comprising at least a strip comprising: a series of discrete interconnected image receiving frames of the diffusion transfer type in which each of the image frames are interconnected by a connecting means also forming part of the first strip.

In an illustrated embodiment, provision is made wherein the supply means supplies a self-developable film assemblage having a first strip of receiving sheet of self-developable material, and generally coextensive therewith a second strip of negative photosensitive film material of the self-developable type having discrete exposable portions spaced apart in end-to-end relationship, whereby each of the exposable portions is superimposable with a corresponding one of image forming portions of the second strip to form a series of respective independent image forming subassemblies when merged into the superposed relationship with each other such that successive exposable portions are presentable at the second opening.

In an illustrated embodiment, provision is further made for means for driving the camera film advancing means in response to removal of the self-developable film assemblage from the exiting means. In this embodiment, the driving means includes means engageable by the film assemblage, whereby advancement of the assemblage directly drives the camera advancing means until the photographic film is advanced to its next successive exposable portion at the first opening. Additionally, the drive means is also operable for allowing the assemblage to continue advancement whereby the processed portions thereof are removed from the exiting means following advancement of the photographic film.

In yet another embodiment, provision is made for the successive portions of the self-developable film being separable by perforations and there is provided an arresting means thereon for engaging spread rollers for impeding passage of the film through the rollers.

In still another embodiment, provision is made for having an elongated film assemblage containing a plurality of spaced apart integral image forming sheets thereon.

In still another embodiment provision is made for a method of producing dual images on self-developable and photographic films. Such method comprises the steps of: providing housing means with a self-developable film exiting means; providing camera means containing photographic film therein within the housing means wherein the camera includes a housing assembly which defines first and second exposure openings; providing a photographic film at the first exposure opening and providing a self-developable film within the housing means at the second exposure opening; exposing at least a portion of both the self-developable and photographic films at the first and second openings; processing at least the exposed portion of the self-developable film within the housing means; and, removing at least the processed portion of the self-developable film from the housing means.

In still another embodiment, provision is made for advancing successive exposable portions of the photographic film at the first opening in response to removal of successive exposed portions of the self-developable film from the housing means, and generally simultaneously placing successive portions of the exposable portions at the self-developable film at the second opening.

In still another embodiment, provision is made for a method of imaging photographic film of the diffusion transfer type. The method includes feeding successive film units from a position remote from a film plane to the film plane for imaging.

Among the objects and features of the present invention are, therefore, the provision of an improved apparatus and method of taking dual images on self-developing and conventional photographic film within a photographic apparatus in a simple and economical manner; the provision of an improved apparatus and method of taking dual images in which advancement of the different films is achieved generally simultaneously; the provision of an improved apparatus and method wherein the photographic film is advanced in response to manual withdrawal of the self-developable film; and, the provision of an improved apparatus and method of providing the film in which each successive exposable and developed film portion is separable from a succeeding portion by virtue of an improved frangible means. Provision is also made for the method of providing a plurality of successive image receiving materials of the integral diffusion transfer type and successively presenting them to the image plane.

Other objects and further scope of applicability of the present invention will become apparent after reading a detailed description when taken in conjunction with the accompanying drawings wherein like reference numerals indicate like structure throughout the several views.

BRIEF DESCRIPTION OF THE DRAWINGS

FIG. 3 is a schematic side elevation view illustrating some of the components missing and yet illustrating other components;

FIG. 4 is a schematic end view illustrating some of the components illustrated in FIG. 3 illustrating some of the cooperation between the film stopping means and film assemblage of the present invention;

FIG. 5 is a schematic plan view illustrating some of the components;

FIG. 12 is view of a pair of spaced negative masks which will be added to the aforenoted film assemblage;

DETAILED DESCRIPTION

Figure 1:
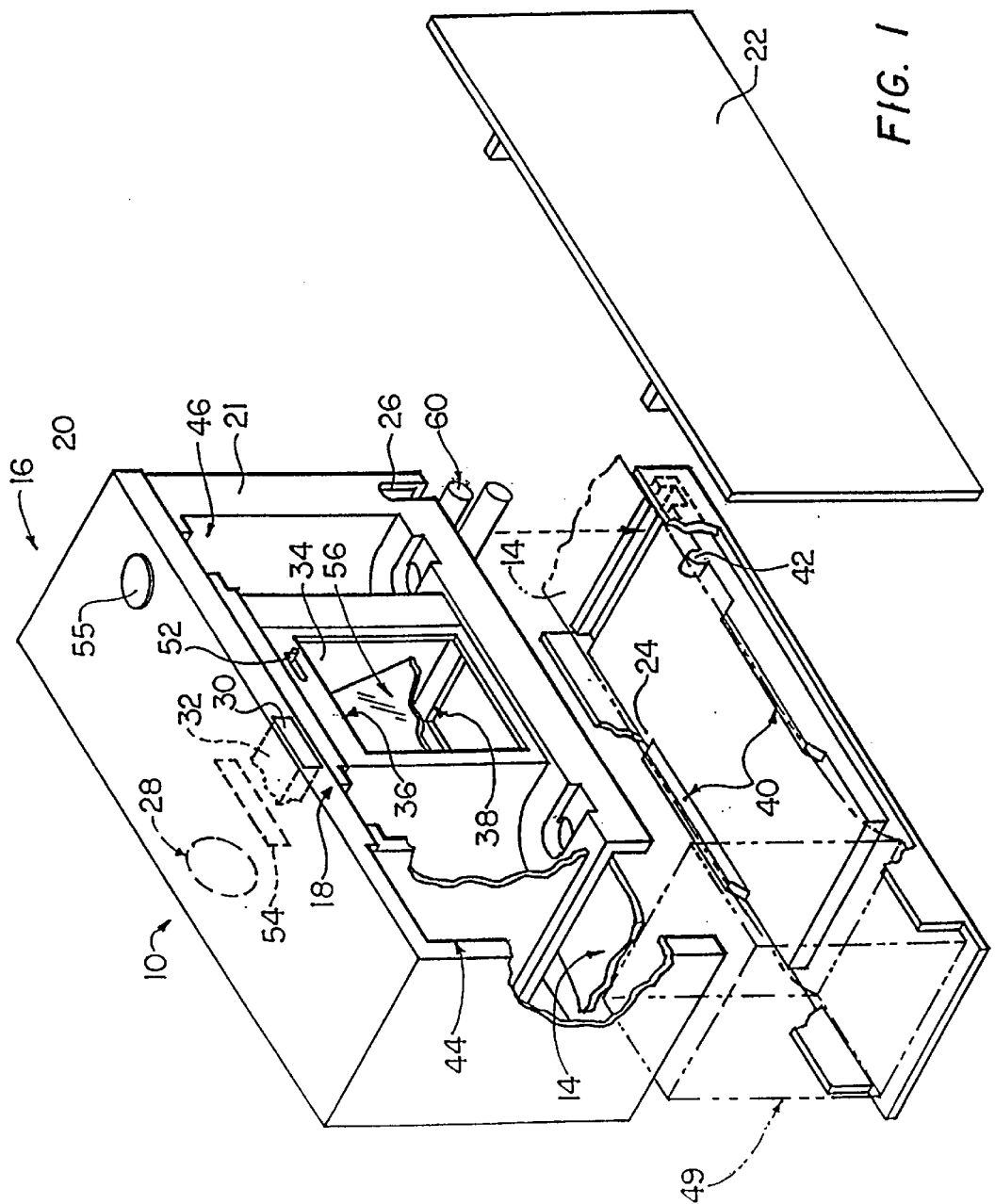
FIG. 1 is a schematic exploded perspective of an improved photographic apparatus made in accordance with the principles of the present invention.
Figure 2:
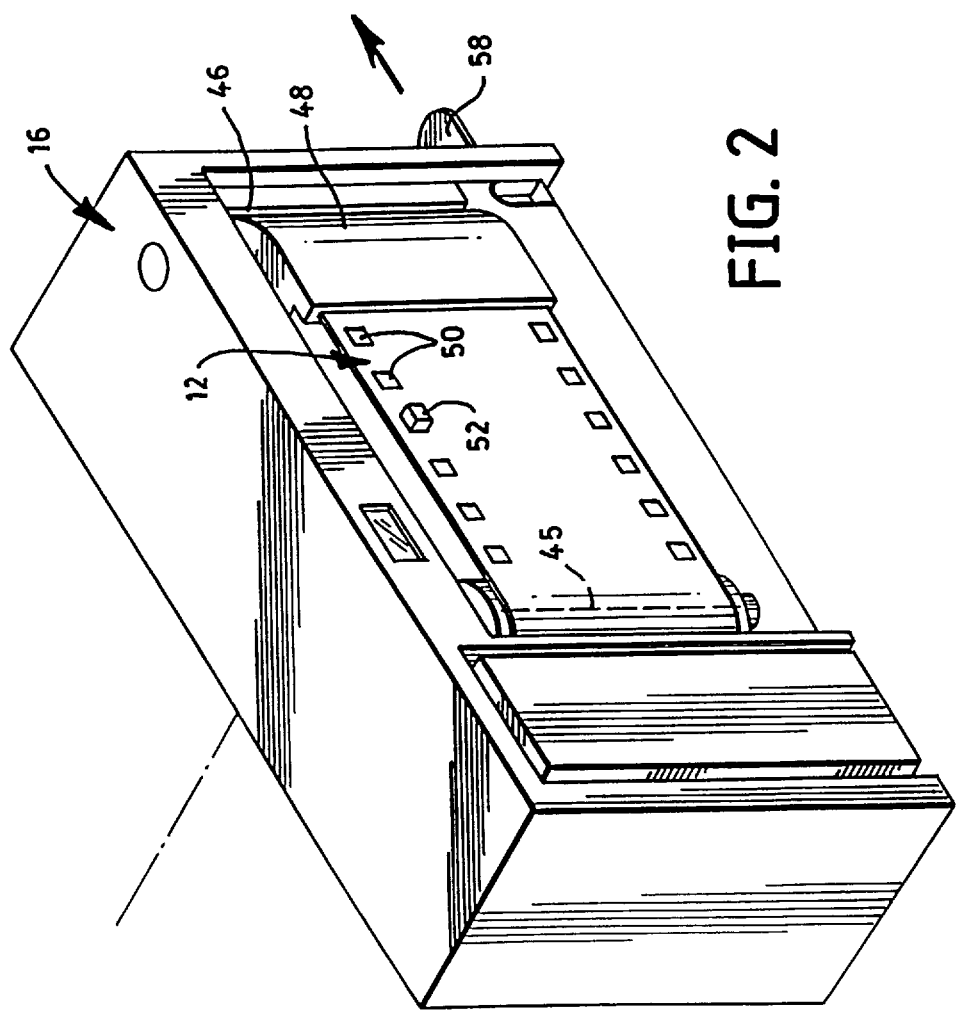
FIG. 2 is a schematic illustrating such photographic apparatus with the films being loaded therein.
Figure 6:
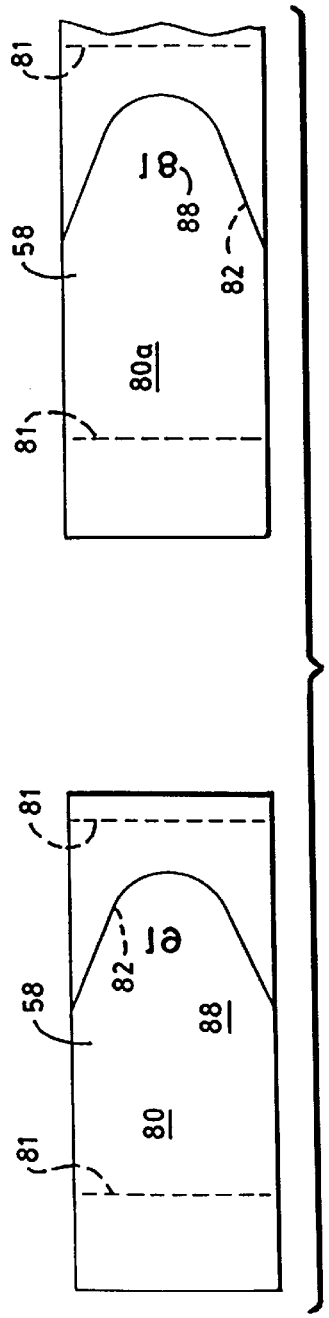
FIG. 6 is a view illustrating a pair of spaced apart positive mask portions of an improved film assemblage made according to the principles of the present invention.

Reference is initially made to FIGS. 1 and 2 for schematically illustrating one preferred embodiment of a photographic camera apparatus, preferably a disposable or singleuse type, being represented generally by reference numeral 10. Essentially, the camera 10 apparatus is adapted for exposing dual images, wherein one is on conventional photographic film 12, and the other is on self-developable or instant film 14 of the diffusion transfer type. The photographic apparatus 10 includes a lighttight housing assembly or means 16 for housing a supply of the self-developable film 14 and having disposed therein a camera subassembly 18 adapted for taking exposures of; for example 35 mm conventional photographic film. While the preferred camera apparatus 10 is described for a singleuse photographic apparatus, wherein the films are already packaged therein, it will be understood that the present invention also envisions that the camera apparatus 10 can be recyclable and indeed reusable.

With continued reference to FIGS. 1 and 2, the housing assembly 16 includes a main or front casing 20, a back cover 22, preferably detachably couplable thereto for covering an opening 21 in the front casing 20; as well as a bottom cover 24 also detachably couplable to the front casing 20 to define a lighttight housing. The front casing 20 includes a film exiting means which is defined as an elongated opening 26 that permits the instant film to be pulled manually therefrom as well as adequately seals light from the interior of the camera housing.

The camera assembly has a taking lens 28, and a rear viewfinder eyepiece 30 for a viewfinder assembly 32. The front casing 20 defines an exposure chamber 34, an exposure aperture 36 for the conventional film 12 and an exposure aperture 38 for the instant film 14. The bottom cover 24 includes a pair of longitudinally extending ribs 40 along at least an intermediate portion of each side thereof as well as a transverse supporting rib 42 which acts to also support the film during such travel and permits the film to slip after the 35 mm film is stopped as will be explained later. The front casing 20 includes a pair of conventional film holding cavities 44 and 46. Convolutions of the rolled unexposed conventional film are mounted on a spool 45 in cavity 44. A conventional 35 mm cassette 48 is adapted to be received within the cavity 46. The sprockets 50 of the film 12 are sequentially engaged by a shutter recock teeth 52 on the recock wheel 53 which protrudes from the front casing. In the present embodiment, a shutter mechanism 54 is generally illustrated herein and is actuated in response to an operator actuating an actuator button 55. The shutter mechanism 54 is set to control a single exposure interval and can be of any known type. For example, the exposure control system can be like that found in conventional singleuse 35 mm cameras; an example of one is sold by Polaroid Corporation under the trademark SIDE-KICK®. The shutter mechanism 54 is recocked in response to advancement of the roll of conventional film 12. Advancement of the conventional film 12 will in the present embodiment be done in response to advancement of the instant film 14. The shutter recocking teeth 52 is engagable with individual sprockets 50 of the film 12, whereby as the film is advanced from one frame to the next, the shutter teeth 52 is moved. Movement of the shutter teeth 52 continues until the recocking wheel is stopped, whereupon the shutter mechanism is recocked and the film 12 has appropriately advanced a single frame. However, the present invention also contemplates a variety of shutter mechanisms being usable.

For splitting the scene images to the two films, provision is made for a neutral density beam splitter 56. The neutral density beam splitter 56 is mounted in the exposing chamber 34, as illustrated, for splitting the image bearing light from the taking lens assembly 28 to the two films at the respective first and second exposure apertures 36 and 38. The neutral density beam splitter 56 has transmission/reflectivity characteristics matched to the respectively different speeds of the two films. It will also be noted that the two exposure areas are at approximately 90 degrees with respect to each other and are, preferably, about the same size.

For effecting frame-by-frame displacement of the photographic and instant films, the instant film 14 is manually pulled from the camera housing 16. In this connection, a leading tab 58 (FIG. 2) of the instant film protrudes from the camera housing 16. The assemblage is storable in the cassette 49 and is gradually withdrawn by pulling actions placed by the user at the tab 58. In this connection, the film 14 is appropriately folded as by z-folds, so that successive frames exit the cassette 49 therefor and travel along a path, as illustrated in the drawings, past the second exposure aperture 38 to the spread roller assembly 60; and, ultimately out the film exit opening 26 (FIG. 2). Details of the spread roller assembly are not given since, they do not per se form an aspect of the present invention. However, reference is made to the last noted copending application for a detailed description thereof, which application is incorporated herein as a part hereof.

With reference to FIGS. 3–5, it will be seen that the 35 mm film cassette is spring biased by a spring 62 that is mounted in the front casing 20. The spring 62 urges also the instant film into engagement with the slip surface on the slip tab 42. A coupling plug 64 fits within a spool receiving portion of the cassette 48 and is coupled thereto for movement therewith, whereby the plug 64 and thus the film in the cassette 48 rotate in response to linear advancement of the instant film 14. The coupling plug 64 is provided with a circular crown member 66 at a distal end thereof which engages the instant film and urges the latter into engagement with the slip surface on the tab 42 under the bias of the spring 62. Hence, as the instant film 14 is pulled along the illustrated path, it rotates the crown member 66 and thus the film in the 35 mm cassette. The film in the 35 mm cassette 48 will continue to rotate until the shutter mechanism stops such movement thereof by virtue of preventing further movement of the recock wheel. This will occur, after a frame of the conventional film is advanced frame-by-frame to the image plane. The slip surface, however, allows continued pulling on the instant film for purposes that will be explained. Accordingly, the instant film 14 is allowed to continue to advance to the exit opening 26. Although the present embodiment illustrates a slip rib 42, the present invention contemplates the use of other similar devices, such as clutch-like devices for allowing continued movement of the instant film even after the film in the cassette 48 stops rotation. Although a coupling plug 64 is disclosed it will be understood that there are also a number of approaches that can be used to effect translation of the linear movement of the instant film to rotational movement of the film in the film cassette 48.

Reference is made to FIGS. 6–14 for illustrating one preferred film assemblage of the instant type for use in providing the instant proof of the simultaneously exposed conventional film unit. Essentially, the following sets forth one preferred assembly and mode of manufacturing the same. It will be understood that any suitable diffusion transfer system may be used in the camera of the present invention. The film assemblage includes a plurality of attached together image forming assemblies of the integral film of the diffusion transfer type. The following discussion will focus on the formation of a single image forming assembly 70. It will be appreciated that each of the image forming assemblies will be constructed in a similar fashion and be arranged in an end-to-end relationship. The image forming assembly frame includes a pair of spaced apart positive masking sheet members 80 and 80a, each having a generally rectangular configuration and being made of a suitable masking material; such as polyester or paper and the like and having coated on one surface thereof a heat sealable layer (not shown) as a part thereof. Each mask member 80 and 80a includes a pair of fold lines 81 and 81a for facilitating the formation of, for instance a Z-fold, such as illustrated in FIG. 3. In addition, each of the masking members includes a perforated area 82. The perforated area has a predetermined strength which is selected to tear in response to a reaction force created by a brake or stopping member 84, as will be described. The stop members are spaced from the leading edge portion so that the stop members engage the spread rollers and the leading edge protrudes from the housing; see FIG. 13. The perforated areas 82 function as frangible means and will permit the separation of successive image forming assemblies. Accordingly, each image forming frame 86 is located between the perforated areas 82. Indicia 88 is placed on each leading tab portion 58 for indicating, among other things, the frame number of the corresponding photographic image. This is advantageous since it eliminates the requirement for the camera having a mechanical film counter.

Figure 7:
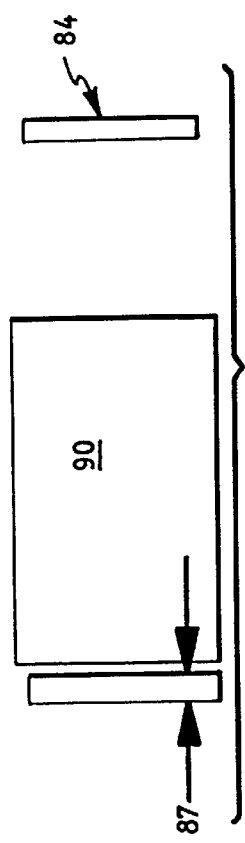
FIG. 7 is a view illustrating an arrangement of receiving sheet, trap and brake which will be joined to the positive masks in accordance with the principles of the present invention.
Figure 8:
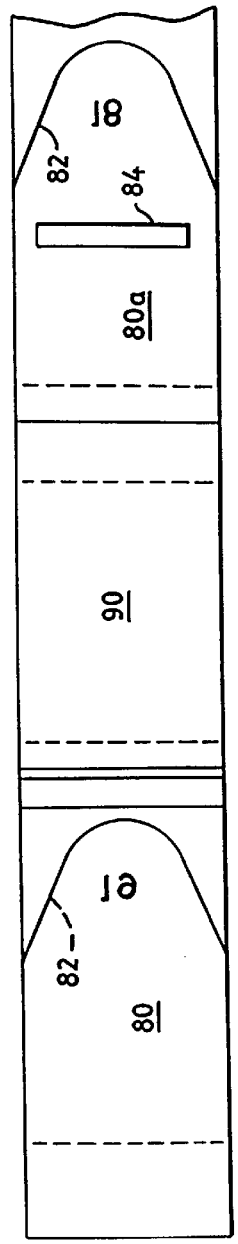
FIG. 8 is a view illustrating an assemblage of the film assemblage components shown in FIGS. 6 and 7.
Figure 13:
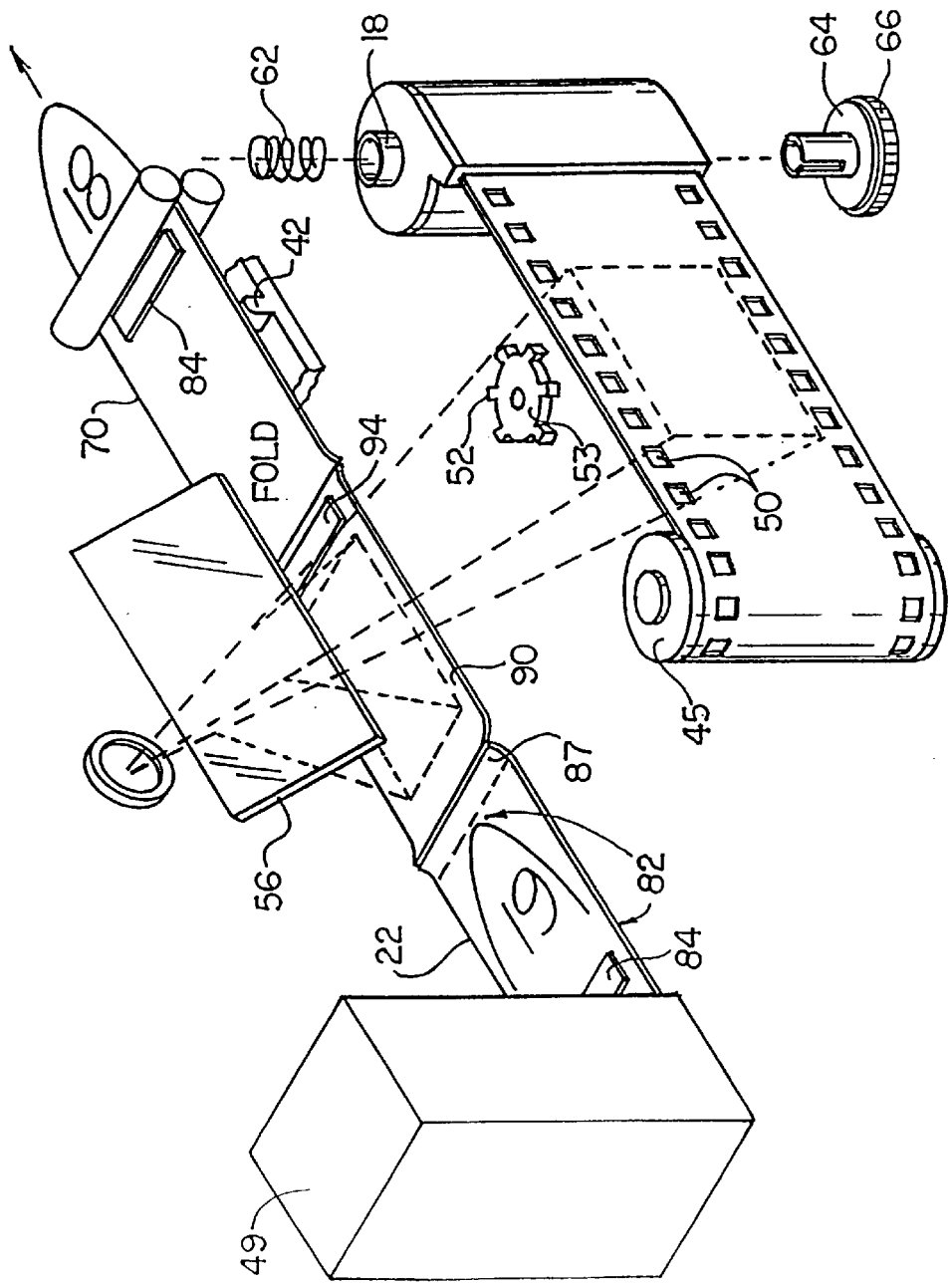
FIG. 13 is an exploded view of the components forming the photographic apparatus with, however, some components missing for clarity; and, FIG. 14 is an enlarged perspective of the cooperation of the cassette and the instant film.

FIG. 7 illustrates an image receiving sheet 90 which is attached as through an appropriate heat activated adhesive at its opposite ends, generally where indicated to the mask members 80 and 80a. The receiving sheet for use instant photography are well known and, therefore, a detailed description is not required. For illustration, reference is made to U.S. Pat. No. 4,740,488 which is commonly assigned herewith which shows such an image receiving sheet. Consequently, the entire film assemblage is comprised of a series of interconnected and alternating series of receiving sheets or frames of the integral diffusion transfer type. A suitable trap 87 is placed on a leading edge of the mask member 80. As noted, each of the generally elongated and rectangular brake members 84 is mounted on each mask just behind each of the tab portions. The brake member 84 inhibits the passage of the film assemblage through the processing rollers with sufficient resistance that when the brake engages the rollers, a pulling action of the user thereon will cause the perforations to separate. After such separation, the extended tab portion 58 on frame 86 will protrude from the camera while the brake engages the rollers as seen in FIG. 13. In this embodiment, the brake member can have a thickness of about 0.030 inch. While a single brake member is shown there is provision for a plurality of brake members arranged in the same manner and having the same size so as to perform the same function.

Figure 9:
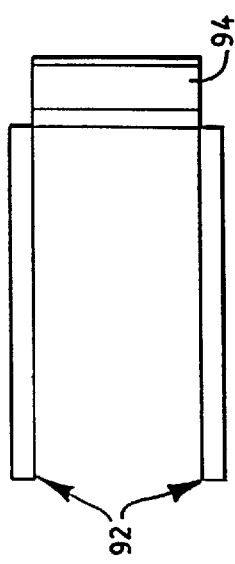
FIG. 9 is a view illustrating a pair of rails and pod.
Figure 10:
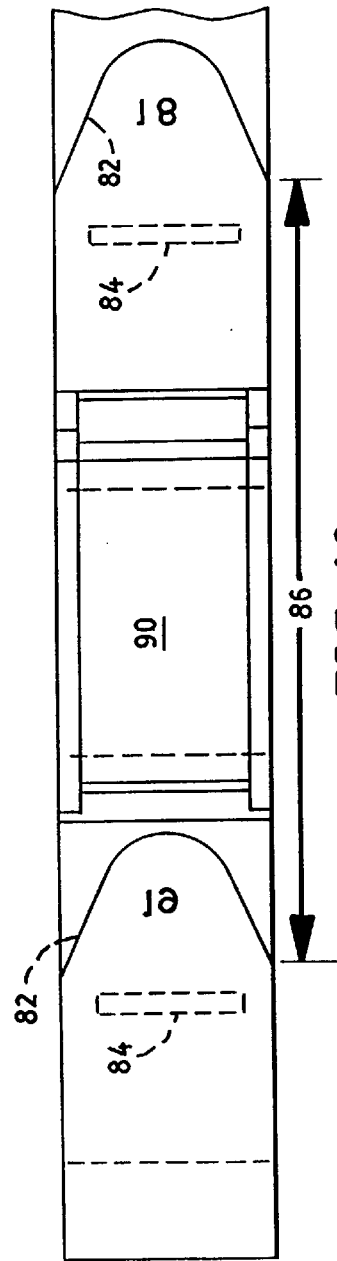
FIG. 10 is a view illustrating the components of FIG. 9 being assembled on the film assemblage of FIG. 8.

FIG. 9 illustrates a pair of elongated rails 92 which may in some of the embodiments serve as masking members which will act to set the gap of the film as well as seal against leakage of the processing fluid contained in a processing pod 94.

The processing pod 94 will contain processing fluid which is well known with the particular imaging assembly being used. In this case, the processing fluid would be able to process self-developing film of the integral type. The rails 92 have the desired shape and thickness to perform the required functions of the film. The pod and rails have the general configuration and spacing as illustrated in the drawings and are well known in construction in the diffusion transfer type.

Figure 11:
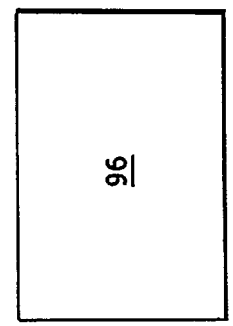
FIG. 11 is a view illustrating a negative segment which will be assembled to the film assemblage.

FIGS. 11 and 12 illustrate respectively the negative photosensitive sheet 96 as well as negative masks 98, 100 having the general shape and size as is illustrated. The negative sheet 96 is attached at its marginal ends to the rails 92 and is placed behind the pod 94. A pair of the negative masks 98, 100 are placed over the opposite ends of the negative 96 at one end thereof as well as to their respective positive masking members. The present invention contemplates other formations of the film assemblage; such as having the rails initially adhered to the negative.

After having explained the above construction of the photographic and film assemblage, it is believed the operation thereof is self-evident.

This completes the description of the preferred embodiments of the invention. Since changes may be made in the above structure and process without departing from the scope of the invention described herein, it is intended that all the matter contained in the above description or shown in the accompanying drawings shall be interpreted in an illustrative and not in a limiting sense. Thus other alternatives and modifications will now become apparent to those skilled in the art without departing from the spirit and scope of the invention as set forth in the following claims.

What is claimed is:

1. Apparatus for generally simultaneously producing images of a scene on self-developable film and photographic film within said apparatus, the photographic and self-developable films each have successive exposable portions, said apparatus comprising: housing means including self-developable film exiting means: means for supplying the self-developable film within said housing means; camera means disposed within said housing means and containing the photographic film therein, said camera means defining first and second exposure openings, whereby successive portions of the photographic film are presentable at said first exposure opening, and successive portions of the self-developing film are presentable at said second exposure opening; means for generally simultaneously exposing the same scene at least a portion of both the photographic and self-developable films at said first and second openings; and means for processing an exposed portion of the self-developable film within said housing means; and, means for allowing removal of successive ones of the processed exposed portions of the self-developable film from said exiting means; means for advancing successive portions of the photographic film to said first opening; and, said means for allowing removal of the self-developable film also allows successive ones of the exposable portions thereof to advance from said supply means to said second opening when corresponding successive ones of processed portions are removed from said exiting means; further including means for driving said film advancing means of the photographic film in response to removal of the self-developable film from said exiting means, whereby advancement of the self-developable film drives said advancing means until the photographic film is advanced to its next successive exposable portion.

2. The apparatus of claim 1 wherein said means for advancing said photographic film and said means for advancing said self-developable film are operated generally simultaneously.

3. The apparatus of claim 1 wherein said advancing means is operated to advance successive ones of said exposable portions of said photographic film in response to removal of successive ones of said processed portions of said self-developable film.

4. The apparatus of claim 1 wherein said exposing means includes means for splitting scene light from a taking lens assembly to said first and second openings.

5. The apparatus of claim 1 wherein said self-developable film includes a series of spaced apart image forming frames including exposable portions of the diffusion transfer type which alternate with a series of connector means.

6. The apparatus of claim 5 in which said self-developable film includes a processing pod located adjacent a leading end portion of each one of said exposable portions, and a corresponding processing fluid trapping means located adjacent a trailing end portion of each one of said exposable portions.

7. The apparatus of claim 6 wherein each of said adjacent leading and trailing portions are folded with respect to each other by a Z-type fold such that a fold line between the adjacent ones is located behind said trapping means.

8. The apparatus of claim 1 wherein said means for allowing removal is operable for allowing manual withdrawal of successive processed portions of said self-developable film.

9. The apparatus of claim 8 self-developable film includes an arresting means thereon operable for arresting movement of said self-developable film whereby successive exposable portions are registerable at said second opening.

10. The apparatus of claim 8 wherein each successive separable portions of the self-developable film includes perforations which allow such separation to occur automatically of each from the other.

11. The apparatus of claim 1 wherein said supply means supplies a self-developable film assemblage having a first strip of receiving sheet of self-developable material, and generally coextensive therewith a second strip of negative photosensitive film material of said self-developable type having discrete exposable portions spaced apart in end-to-end relationship, whereby each of said exposable portions is superimposable with a corresponding one of image forming portions of said second strip to form a series of respective independent image forming subassemblies when merged into the superposed relationship with each other such that successive exposable portions are presentable at said second opening.

12. A method of generally simultaneously producing images of a scene on self-developable and photographic films wherein the photographic and self-developable films each have successive exposable portions, comprising the steps of: providing housing means with a self-developable film exiting means; providing a camera means containing photographic film therein within the housing means wherein the camera means includes first and second exposure openings; placing a photographic film at the first exposure opening and placing the self-developable film at the second exposure opening; generally simultaneously exposing at least a portion of both the self-developable and photographic films at the first and second openings; respectively, with the common scene; processing at least the exposed portion of the self-developable film within the housing means; and removing at least the processed portion of the self-developable from the housing means; whereby the photographic film is advanced in response to removal of the exposed and processed self-developing film from the housing means.

13. The method of claim 12 wherein said photographic and self-developable films each have successive exposable portions.

14. The method of claim 13 further comprising the steps of placing exposable portions of both the self-developable and photographic films simultaneously at the second and first openings; respectively.

15. The method of claim 14 wherein the step of placing successive exposable portions of the photographic film at the first opening occurs in response to removal of successive exposed portions of the self-developable film from the housing means and generally simultaneously with placing successive portions of the exposable portions at the self-developable film at the second opening.

16. The method of claim 15 wherein the step of providing the camera means includes the step of providing a singleuse camera.

17. The method of claim 16 wherein the step of providing the self-developable film includes providing a strip thereof containing successive discrete exposable portions with rupturable fluid processing means adjacent a leading end portion of each exposable portion; and said placing step includes placing successive exposable portions at the second opening.

18. The method of claim 17 wherein the step of processing includes providing a pressure-applying means within the housing means for applying pressure to successive rupturable means of exposed portions so that processing fluid within the rupturable means is spread over the exposed portions prior to removal thereof from the housing means.

19. The method of claim 14 wherein said exposing step includes using a common taking lens assembly and splitting image bearing light from the scene through the taking lens assembly toward the respective first and second openings.

20. A film assemablage of the instant-developing type comprising: a plurality of image receiving subassemblies spaced linearly therealong; each of said subassemblies having frangible portions; and arresting means on each of said subassemblies for engaging processing means which defines a nip within a photographic apparatus for providing resistance which allows the leadmost frangible portion, in the direction of pulling, to break whereby the leadmost subassemblies separate from the assemblage upon engaging the processing means, said arresting means being movable past the nip when the resulting leadmost subassembly is pulled, wherein said arresting means is comprised of at least a thin member having preselected thickness sufficient for inhibiting the passage of the film assemblage through the nip; and for permitting passage of said thin member through the nip at a higher pulling force being exerted on said assemblage than the pulling force which facilitates the breaking of the frangible portion.

21. A method of separating successive film assemblies, comprising the steps of:

providing a strip comprising a plurality of discrete film assemblies arranged in a generally linear relationship to one another and each one interconnected to another by corresponding frangible portions;

providing an arresting means on each of the film assemblies, wherein each of the arresting means engages structure to thereby arrest movement of the film assemblies when the strip is pulled with a pulling force;

arresting movement of the arresting means on each of the film assemblies, whereby a frangible portion between a leadmost film assembly and a successive film assembly will separate in response to the arresting means engaging structure while pulling forces are exerted on the strip.

22. Apparatus for generally simultaneously producing images of a scene on successive portions of a strip of self-developable film and a roll of photographic film, said apparatus comprising: a housing assembly, a taking lens assembly for directing scene light to both the photographic and self-developable films located at distinct exposure openings, an exposure mechanism operable for taking simultaneous exposures on the photographic and self-developable film; a processing assembly for processing each of the self-developable film assemblies which are exposed as the self-developable film assemblies are withdrawn from the housing assembly, a photographic film advancing assembly operable of advancing successive exposable portions of the photographic film to one of said exposure openings; and, further including means for driving said film advancing assembly in response to successive withdrawal of the self-developable film strip from an exiting means formed in said housing assembly, whereby withdrawal of the self-developable film drives said advancing assembly unit the photographic film is advanced to its next successive exposable portion.

* * * * *